J. H. Ernest,
Corn Planter.
No. 91,106. Patented June 8, 1869.
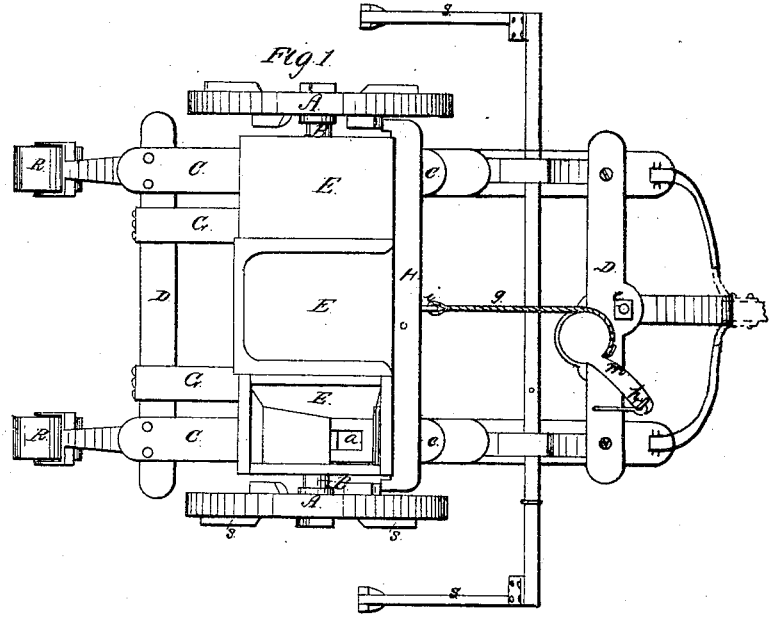
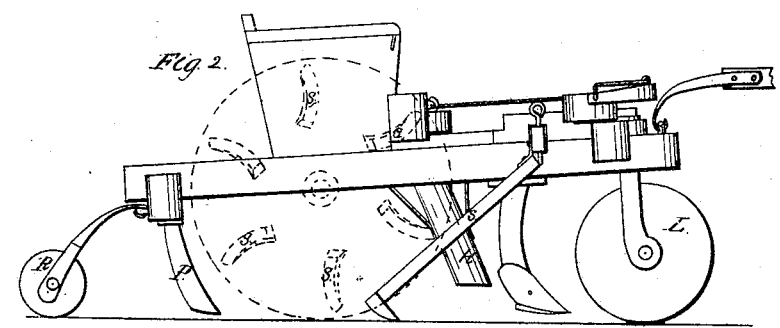
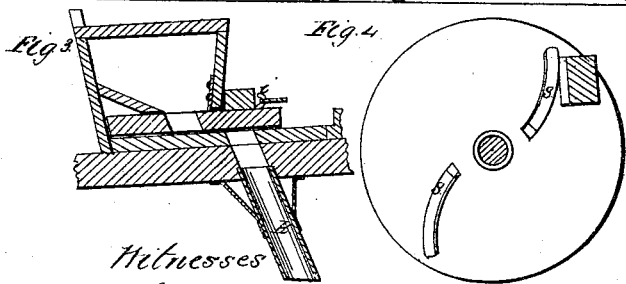
Witnesses
J. P. Greves
D. D. Kane
Inventor
J. H. Ernest
Chipman, Hosmer & Co.
atty.

United States Patent Office.

JOHN H. ERNEST, OF MILLERSTOWN, PENNSYLVANIA.

Letters Patent No. 91,106, dated June 8, 1869.

IMPROVEMENT IN CORN-PLANTERS.

The Schedule referred to in these Letters Patent and making part of the same.

*To all whom it may concern:*

Be it known that I, JOHN H. ERNEST, of Millerstown, in the county of Perry, and State of Pennsylvania, have invented a new and valuable Improvement in Corn-Planters; and I do hereby declare that the following is a full, clear, and exact description of the construction and operation of the same, reference being had to the annexed drawings, making a part of this specification, and to the letters and figures of reference marked thereon:

Figure 1, of the drawings, is a top plan view of my invention.

Figure 2 is a longitudinal sectional view of the same.

Figures 3 and 4 are details.

My invention relates to corn-planters; and

It consists in a novel arrangement and combination of devices, by which the operator may plant, cover, and roll two rows of corn, and, at the same time, mark another row, all at one movement of the machine.

The letters A, of the drawings, represent the wheels of a sulky firmly attached to the axle B.

The letters C are side-bars, and

The letters D are end cross-bars, that constitute a frame, arranged upon the axle in the manner shown, the bars C forming bearings for said axle.

The letter E represents the hoppers and driver's seat of my planter arranged upon the frame, as shown.

An opening, $a$, is left in the bottom of each hopper, for the passage of the seed downward, as hereinafter mentioned.

Under each hopper, and upon the bars C, respectively, I adjust slides, marked $c$ on the drawings, to the rear ends of which I attach the springs G, which said springs are fastened firmly to the rear cross-bar of the frame, in the manner shown.

The front ends of these slides $c$ are united by means of the cross-bar H.

The letter L is a caster, adjusted in the front cross-bar of the frame by means of a nut and screw, marked $e$, by which said nut or screw the caster is raised or lowered at will, and thereby the depth of the furrows determined.

The letter M represents a lever, operating like a windlass, and connected with the cross-bar H by means of the rope or chain $g$, in the manner shown.

I affix a small hook, $h$, to the end of this lever, which, when the slides $c$ are drawn forward, may be hooked in the opening $i$ of cross-bar H, and, by means thereof, said slides held securely in that position. When in that position, the bottoms of the hoppers are closed.

The letters K are conduits for the seed from the hoppers. They are, respectively, inserted in openings in the side-pieces C, which openings pass through said side-pieces, to a point under or immediately forward of the hoppers, and communicate therewith.

My coverers are affixed to the rear cross-bar of the frame, and are represented by the letter P.

The letters R are rollers, attached to the frame, in the manner shown. They serve to press the soil firmly upon the seed after the same is planted and covered.

The letter S represents the marker. It is an adjustable bar, moving to the right or left in suitable mortises in or upon the side-pieces of the frame, and secured in the desired position by a small pin that passes through the same, and rests against the side of the frame.

It will be observed that the wheels of my sulky have flanches or cams, marked $s$, both on their inner and outer sides. These wheels are reversible, with two cams on one side, and six on the other.

The office of these cams is to work against the rear side of cross-bar H, and thereby open or close the openings in the bottoms of the hoppers, by operating the slides $c$.

To plant corn at the usual and ordinary space for hills, I turn that side of the wheels which has fewest cams upon them toward the hoppers; but, when I desire to plant seeds which require less space between the hills, I turn the sides of the wheels inward which have many cams upon them.

My planter is adapted to the planting of cotton as well as corn, and, in fact, to nearly all seeds which should be planted in hills.

What I claim as my invention, and desire to secure by Letters Patent, is—

1. The lever M, chain $g$, and hook $h$, when arranged and operating substantially as and for the purposes described.

2. In combination with a planter having all the parts herein described, the marker S, when constructed and operating as set forth.

In testimony that I claim the above, I have hereunto subscribed my name, in the presence of two witnesses.

JOHN H. ERNEST.

Witnesses:
C. HEISEY,
R. CATHCART.